United States Patent [19]

Sawyer et al.

[11] Patent Number: 4,529,985
[45] Date of Patent: Jul. 16, 1985

[54] MTI VELOCITY DISCRIMINATOR

[75] Inventors: Larry W. Sawyer, Charlottesville, Va.; Harry Boler, Liberty, Mo.

[73] Assignee: The United States of America as represented by the Secretary of Transportation, Washington, D.C.

[21] Appl. No.: 406,752

[22] Filed: Aug. 10, 1982

[51] Int. Cl.³ .............................................. G01S 13/52
[52] U.S. Cl. ...................................... 343/7.7; 343/7 A
[58] Field of Search ................................ 343/7 A, 7.7

[56] References Cited

U.S. PATENT DOCUMENTS

| 3,417,396 | 12/1968 | Stifter et al. | 343/7.7 |
| 3,775,768 | 11/1973 | Lisle et al. | 343/7.7 |
| 3,787,851 | 1/1974 | Hughes | 343/7.7 |
| 3,902,174 | 8/1975 | Siegel | 343/7.7 |
| 3,972,041 | 7/1976 | Howard | 343/7.7 |
| 4,049,953 | 9/1977 | Evans, Jr. | 235/150.3 |
| 4,057,800 | 11/1977 | Ganz | 343/8 |
| 4,093,948 | 6/1978 | Long, III | 343/7 A |
| 4,117,538 | 9/1978 | Shrader et al. | 343/7.7 |

Primary Examiner—T. H. Tubbesing
Attorney, Agent, or Firm—Otto M. Wildensteiner; Harold P. Deeley

[57] ABSTRACT

A digital Moving Target Indicator (MTI) radar system for rejection of low velocity "clutter" by utilizing techniques to identify those radar echo returns from targets having radial velocities lower than fixed predetermined values. For digital MTI radars that have a response which is a periodic function of the radar's Pulse Repetition Frequency (PRF) and doppler frequency shift of the received radar signal relationships exist whereby (a) optimum target velocities which correspond to the maximum canceler gain can be calculated from the radar's PRF; (b) the canceler response can be expressed in terms of a periodic canceler response function which incorporates the ratio of the actual target velocity to the optimum target velocity; and, (c) the output amplitude from the canceler can be determined from the input amplitude to the canceler produced by the MTI receiver's coherent phase detector and the periodic canceler response function. Thus, for a particular target velocity and a number of different input amplitudes the corresponding output amplitudes from the canceler are calculated. These canceler output amplitudes are stored in an electronic memory which is accessed in terms of the input amplitude produced by the coherent phase detector. The canceler output amplitude read from the memory is compared with the actual canceler output to determine whether the output should be treated as clutter or a target having a radial velocity greater than the preselected fixed value.

6 Claims, 3 Drawing Figures

MTI VELOCITY DISCRIMINATOR

BACKGROUND OF THE INVENTION

In the art of digital radar system design it is known how to design and build digital radar systems which have enhanced capabilities for identifying targets that are moving relative to the position of the radar system. A well known physical effect which these digital radar systems use to distinguish received echo signals from targets moving relative to the radar system as opposed to received echo signals from targets which are not moving relative to the radar system is the determination of doppler frequency shift that is superimposed on the frequency of the radar system's transmitter output pulse. This determination is made at the digital radar receiver station by comparing the output frequency of the radar system's transmitter with the frequency of the received echo signal.

Doppler frequency shifts can have a very small value compared to the frequency of the radar's transmitter. This results from the fact that the doppler frequency shift for a radar signal as reflected from a moving target is proportional to the product of the target's radial velocity (i.e. the target's velocity relative to the location of the radar system) times the frequency of the transmitted radar pulse divided by the speed of light. Since the speed of light is a very large number compared to the radial velocity of most targets of interest, the division of the speed of light into the product of radial velocity times the output frequency of the radar can result in a small value for the doppler frequency shift. Due to this situation enhanced identification of moving targets is required beyond that achieved by frequency shift measurements, and to accomplish this enhancement the frequency shift measurements for received signals are compared with previously determined frequency shifts for received signals in such a manner as to cancel echo signals which have non-varying frequency shifts. These non-varying signals are indicative of stationary targets and their cancellation accordingly increases the probability of positively identifying signals from targets moving relative to the radar's location. Radars which utilize phase shift detection and cancellation of phase shifted signals are identified in the art as Moving Target Indicator (MTI) radars. The theory of MTI radars is explained in the book "Introduction to Radar Systems" by Merril I. Skolnik, published by McGraw-Hill Book Company in 1962.

For certain applications the performance of digital MTI radars can be inadequate. A reference which teaches a method for providing sophistication to enhance moving target identification is U.S. Pat. No. 3,775,768. The invention claimed in that patent is based on a comparison of received radar signals with stored electronic signal values to control performance of the radar receiver. Specifically the U.S. Pat. No. 3,775,768 discloses a clutter cancellation notch filter selection means for MTI radars in which the filter characteristic is varied as a function of both the clutter amplitude and the clutter bandwidth. Stored threshold values are used to provide a comparison between clutter amplitude, clutter bandwidth and the desired rejection notch filter characteristics. When a comparison is present, an enabling signal is fed to the clutter rejection filter to alter feedback characteristics, thereby providing the desired notch filter characteristics.

Prior art attempts to improve the performance of MTI radars, however, have not effectively utilized the parameter which is of ultimate interest and value to the users of such radars, i.e. doppler frequency shift, to enhance identification of moving targets and accordingly reduce the presentation of clutter.

SUMMARY OF THE INVENTION

The identification of moving targets which are of interest as opposed to slow moving targets which are not of interest is a significant and sophisticated radar problem. Even ground based digital MTI radars receive doppler frequency shifted radar echo signals from objects that ultimately produce false and confusing radar data; such targets can include for example hydrometeoric phenomena (such as rain, hail and snow systems). An important physical characteristic associated with these false data producing targets is their velocity which generally is low. In order to improve the capability of digital MTI radars by identifying such false data producing targets and rejecting their radar signals the present invention catagorizes radar signals according to target velocities and rejects signals below predetermined radial velocity values.

Digital MTI radars through coherent phase detection and either single or multiple cancellation filtering of digitized video signals effectively reject most signals produced by stationary targets. This rejection of signals produced by stationary targets is achieved by not only the coherent phase detection of received radar signals, which identifies received radar signals that have been frequency shifted due to reflection from targets, but also the filtering of the digitized video signal from the coherent phase detector by comparison of the received signals for a time period equal to the period between transmitted radar pulses with the signal from such previous time periods. The cumulative effect of such detection and cancellation filtering is to produce a relative receiver response which when compared with the frequency shift from the radar's transmitter frequency is periodic having a zero response for signals which have not been doppler shifted together with null responses at periodic doppler frequency shifts determined by the parameters of the radar.

After recognizing that this characterization of a digital MTI radar's relative receiver response is presented against a frequency scale which is measured in terms of the variance from the radar's transmitter frequency it is appreciated that such a scale can be directly interpreted as a target velocity scale. Accordingly, with a knowledge of the shape of the cancellation filter's response, and selection of a specific target velocity and of a signal amplitude as outputted from the coherent phase detector, it is possible to calculate the amplitude of such a signal after its processing by the cancellation filter. This calculation completely characterizes the signal from the cancellation filter as to amplitude and target velocity. With such information it is possible to compare signals from the cancellation filter with calculated values on a basis of both the output signal amplitude from the coherent phase detector and the output signal amplitude from the cancellation filter to determine target velocity.

Beyond identification of target velocity it is feasible, as will be discussed in greater detail hereinafter, to compare signal amplitudes as outputted from the cancellation filter with calculated signal amplitudes. The calculated signal amplitudes would be for signals which have the same amplitude as outputted from the coherent phase detector as that of actual radar echo signals and also for radar echo signals which are received from targets of a preselected radial velocity. Comparison of such cancellation filter output signal amplitudes and calculated signal amplitudes can be used to determine if the signals outputted from the cancellation filter were received from targets moving at a lower radial velocity than that which was preselected.

BRIEF DESCRIPTION OF THE DRAWINGS

The aforementioned aspects and other features of the invention are explained in the following description taken in connection with the accompanying drawings wherein.

DESCRIPTION OF THE PREFERRED EMBODIMENT

Figure 1:
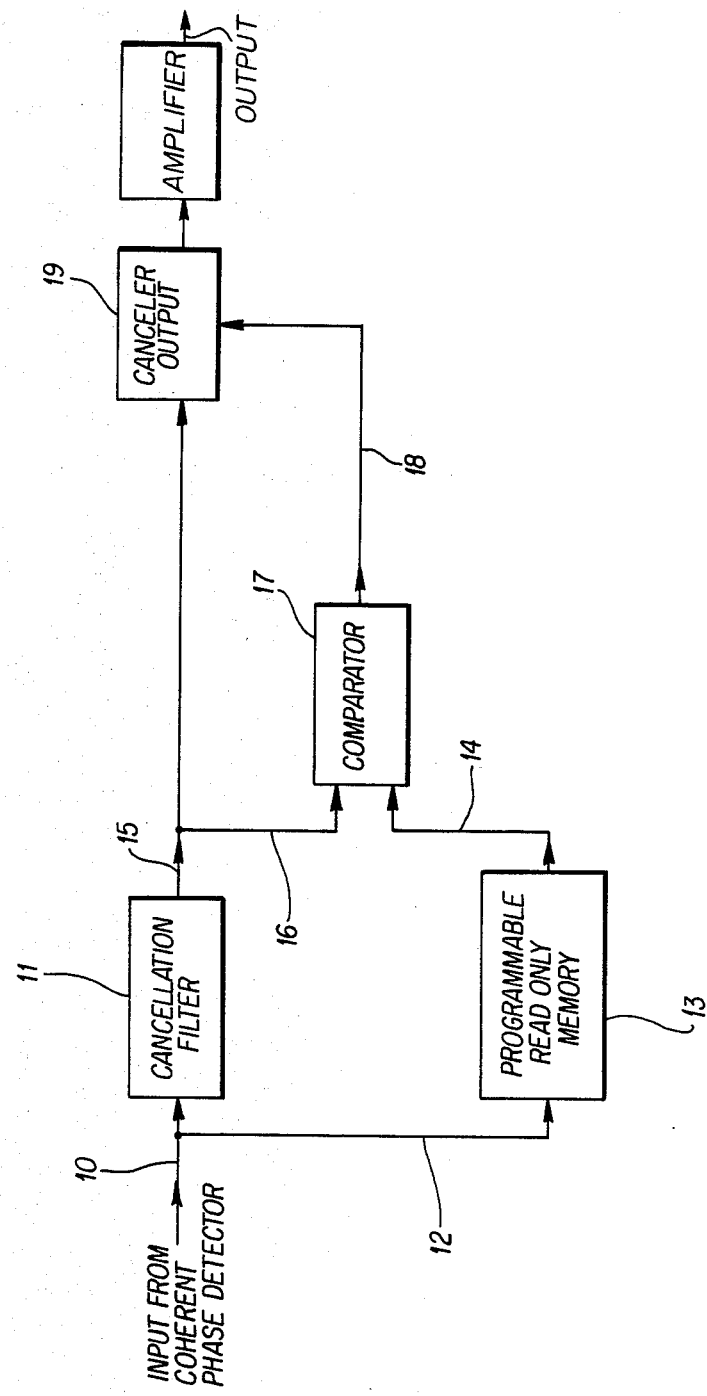
FIG. 1 is a block diagram of a typical circuit arrangement in accordance with the present invention.

Referring now to the drawings and more particularly to FIG. 1, an overall block diagram of a typical circuit arrangement in accordance with the present invention is shown.

Beginning at the signal input 10, the cancellation filter 11 is recognized as common and well known in the design and functioning of digital MTI radars. From signal input 10 identical signal 12 is inputted to the programmable read only memory 13 as is inputted to cancellation filter 11. The output at 14 of the programmable read only memory 13 is the digitized signal amplitude corresponding to the calculated output from cancellation filter 11 for an inputted signal corresponding in amplitude to that at 10 and which would be produced by cancellation filter 11 for a target having a preselected radial velocity. The calculation of such signal amplitudes for storage in the programmable read only memory 13 will be described in detail hereinafter. Output 14 is inputted to comparator 17 along with the output from cancellation filter 11 via electrical connection 16. Comparator 17 determines if the amplitude of the signal from cancellation filter 11 is greater than the amplitude of the signal from the programmable read only memory 13. If the amplitude of the signal from the cancellation filter 11 is greater no output is produced by comparator 17. However, if the amplitude of the signal from the cancellation filter 11 is equal to or less than the amplitude of the signal from the programmable read only memory 13, then the signal inputted at 10 is a radar echo signal from a target having a radial velocity equal to or less than that of the preselected velocity. Accordingly, a signal is outputted from comparator 17 via electrical connection 18 to the canceler output circuitry 19. At canceler output circuit 19 the signal inputted via electrical connection 18 inhibits the signal inputted to canceler output circuit 19 via electrical connection 15 from cancellation filter 11. Thus, all signals from targets having radial velocities equal to or less than the preselected velocity will be rejected by the circuitry described above. As will be described in detail hereinafter, signals about the periodic blind notches also will be rejected.

The circuitry as represented by the block diagram shown in FIG. 1 was added to the circuitry of a Westinghouse ARSR-3 MTI search radar, which is a long range, low Pulse Repetition Frequency (PRF), "L" band system; such modification provided significant improvement of the ARSR-3 radar's capability to reject false data. False alarm rates of greater than 999 at 0.5 degrees electrical antenna tilt were reduced to less than 75. These rates were measured in a live environment with 100 to 300 real target tracks against a probability of false alarms of $1 \times 10^{-6}$. Prior to modification, electrical antenna tilts of 2.5 degrees and greater were used to lower the false alarm rate. Heavy Sensitivity Time Control (STC) curves were also used to reduce the false alarm rate, thereby reducing target detection at close-in ranges. The circuitry modification described in FIG. 1 permitted lower electrical antenna tilts, which (1) improved minimum altitude coverage at maximum ranges; (2) provided effective use of STC for target detection at minimum and maximum altitudes inside 96 nautical miles range; (3) increased maximum range of high beam switching from 35 nautical miles to 70 nautical miles; and, (4) improved target detection 1 db through the use of lower target threshold values in the digital processor.

The method for calculating the output from the cancellation filter 11 will be described below for a double delay line canceler similar to that used by the ARSR-3 radar. However, as is apparent from the discussion below, similar calculations are directly applicable to other digital MTI radars employing cancellation filters which have frequency dependent periodic response functions. This analysis begins with the writing of the frequency response function for the digital MTI radar's canceler, in this case a double delay line canceler network, which is:

$$20 \log(\sin^2 \pi f T)$$

where f is the doppler frequency shift,

T is the radar transmitter pulse recurrence time. To better understand this frequency response function refer to FIG. 2 which is a graph of the function $\sin^2 x$. The vertical scale is 20log $\sin^2 x$ and the horizontal scale is in radians. Since the maximum (optimum) output of this function occurs when $\pi f T = \pi/2$, the optimum doppler frequency shift is $\frac{1}{2}T$. With this understanding the following definitions and equations will be used:

$$F = \frac{1}{2T} = \frac{1}{2(PRF)}$$

where F is the optimum doppler frequency shift. Therefore, using the well known equation for calculating doppler frequency shift the optimum radial target velocity (V), corresponding to the optimum doppler frequency shift, in units of knots can be calculated using the following relationship:

$$V = \frac{3 \times 10^4 F}{102 f_t}$$

where
F is the optimum doppler frequency shift in Hertz (Hz)
$f_t$ is the radar transmitter frequency in megahertz (MHz).

Thus, the frequency response of a double delay line canceler network can be written as:

$$20 \log \left( \sin \left( \frac{\pi f}{2F} \right) \right)$$

or as:

$$20 \log \left( \sin \left( \frac{\pi v}{2V} \right) \right)$$

where v is the radial target velocity corresponding to a doppler frequency shift of f.

Figure 2:
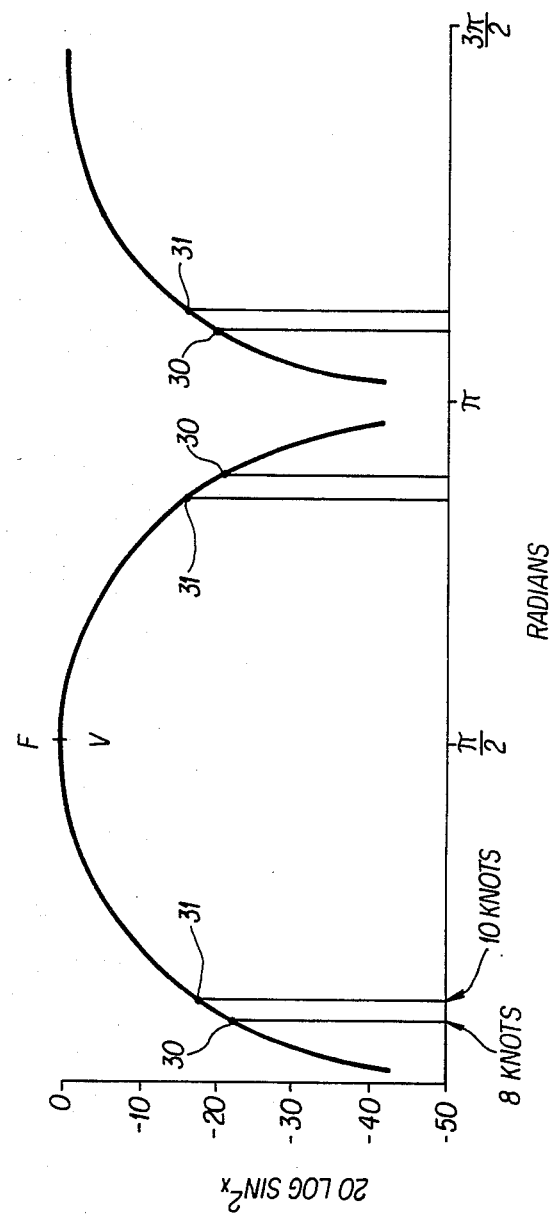
FIG. 2 is a graphical representation of the relative response of a double delay line cancellation filter where the vertical scale is 20 log $\sin^2 x$ and the horizontal scale is in radians; and, FIG. 3 is a graphical representation of the relative response of a double delay line cancellation filter where the shape of the filter's response has been modified in accordance with the present invention.

Now it is readily apparent that the horizontal scale of FIG. 2 can be graduated in units of radial target velocity as well as radians.

For example, to obtain the actual frequency response for a double delay line canceler network which is used with a radar transmitter having the following parameters:

PRF = 326.3 Hz $f_t$ = 1300 MHz the optimum doppler frequency shift and the optimum radial target velocity must be calculated.

$$F = \frac{PRF}{2} = 163.15 \text{ Hz}$$

$$V = \frac{3 \times 10^4 F}{102 f_t} = 36.9 \text{ knots}$$

With this value for V the actual frequency response for a double delay line canceler network which is used with a radar transmitter as specified above can be calculated for various radial target velocities as shown below.

For v = 8 knots

For $v$ = 8 knots $$20 \log \sin^2 \left( \frac{\pi v}{2V} \right) = 20 \log \sin^2 \left( \frac{\pi \times 8}{2 \times 36.9} \right) = -19.05 \text{ db}$$

For v = 10 knots

For $v$ = 10 knots $$20 \log \sin^2 \left( \frac{\pi \times 10}{2 \times 36.9} \right) = -15.3 \text{ db}$$

These points are shown in FIG. 2 at the locations marked 30 and 31. Also shown are the image points that repeat at the periodic null intervals of the canceler's response function. The image points are located about the blind notches, which for a double delay line canceler are located at integral multiples of $\pi$. Since the target velocity at $\pi/2$ is 36.9 knots the target velocity at $\pi$ is 73.8 knots and the image points are at velocity values of 73.8±8 knots and 73.8±10 knots respectfully. This situation repeats at integral values of $\pi$.

Given the stability and resolution of a digital MTI canceler it is possible to employ amplitude techniques to generate a digital velocity discriminator. The central concept is to use the slope of the canceler response function to eliminate low velocities. For a digital MTI double delay line canceler the output amplitude from the canceler is a function of the sin²x curve and the input amplitude from the coherent phase detector. This relationship is shown in the following equation:

$$\frac{E_{out}}{E_{in}} = \sin^2 x = \sin^2 \left( \frac{\pi v}{2V} \right)$$

where
$E_{out}$ is the output amplitude from the canceler
$E_{in}$ is the input amplitude from the coherent phase detector.

Using all possible input amplitudes and a single radial target velocity will produce all possible canceler output amplitude values for the preselected radial target velocity. As an example, for a radial target velocity of 8 knots and a radar transmitter as specified above.

$$E_{out} = E_{in} \sin^2 \left( \frac{\pi \times 8}{2 \times 36.9} \right)$$

In the same manner, other values of radial target velocities may be used. This input amplitude method relies upon the digital radar receiver's ability to provide over clutter signals the actual target signal amplitude changes as a function of radial target velocity; therefore, the linear dynamic range of the coherent phase detector must be sufficient to provide such signal amplitudes. Also, the cancellation filter must provide an output which is the combination of target and clutter or the detection of targets over clutter will vary with the clutter amplitudes.

Figure 3:
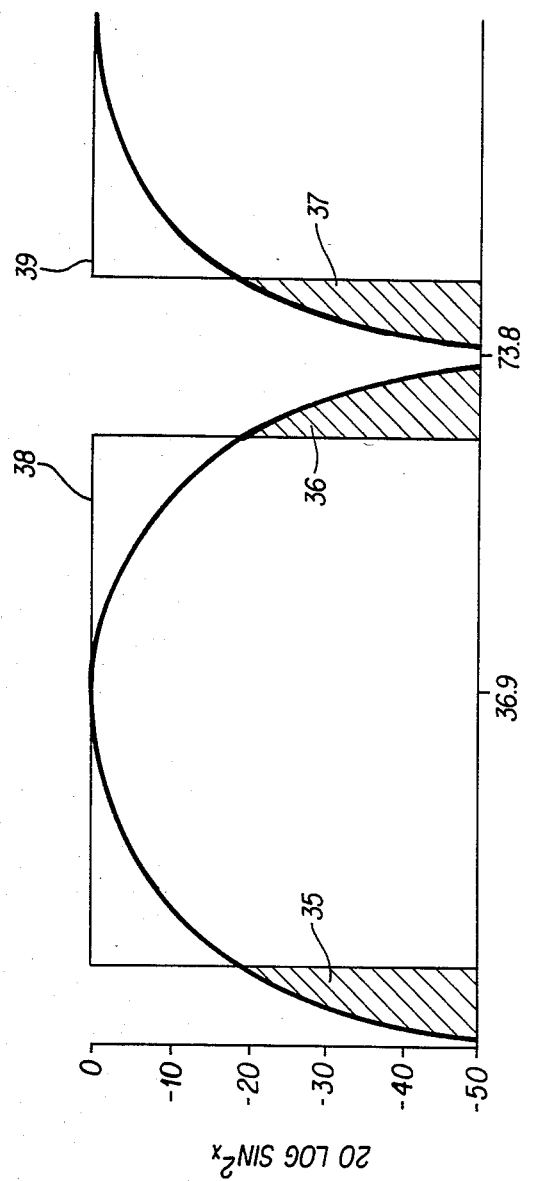

Thus, by calculating the outputs from the cancellation filter as a function of coherent phase detector output signal amplitude and radial target velocity, and storing these values in a programmable read only memory which can be addressed by the coherent phase detector output signal amplitude, a comparison can be made to determine which of the signals from the cancellation filter is the signal from a target with a radial velocity equal to or less than the preselected radial target velocity. Accordingly, such cancellation filter output signals can be rejected, which results in the output from the cancellation filter being modified as shown in FIG. 3, where the signals in the shaded areas 35, 36 and 37 are rejected. Additionally, it is possible to enhance the signals processed by the cancellation filter which are produced by targets having radial velocities greater than those of the preselected radial target velocity. Such enhancement by amplification means well known in the art such as amplifier 20 would produce square cancellation filter response shapes as shown by 38 and 39 in FIG. 3.

Accordingly, the preferred embodiment shown by the circuit block diagram in FIG. 1 which eliminates radar echo signals from being displayed by digital MTI radars that are produced by targets having radial velocities equal to or less than preselected radial velocities has been described in detail. Certain variations and modifications will suggest themselves to those skilled in this art, therefore, it is not intended that the drawings in this description should be regarded as comprising a limitation on the scope of the invention, the latter being illustrative and typical only.

What is claimed is:

1. A digital electronic receiver for pulse echo signals produced by a transmitter and reflective targets, which receiver discriminates moving targets from received echo signals that include both target returns and clutter returns, said receiver comprising:

means for detecting phase differences between each received signal and said transmitted signals and processing said phase difference signals through a Moving Target Indicator (MTI) canceler;

means for calculating the electronic signal amplitude which would be produced by said MTI canceler as a function of a predetermined radial target velocity and a predetermined phase difference signal input amplitude;

means for comparing said calculated electronic signal amplitude with the electronic signal amplitude produced by a received signal having the same phase difference signal amplitude which has been processed by said MTI canceler to determine if said electronic signal amplitude produced by a received radar signal is equal to, greater than or less than said calculated electronic signal amplitude;

means for rejecting MTI canceler output signals if the electronic signal amplitudes for said received signals are lower than the calculated electronic signal amplitudes for a predetermined radial target velocity having phase difference signal amplitudes that are equal to those of said received signals.

2. In a digital electronic receiver for pulse echo signals produced by a transmitter and reflective targets, which receiver discriminates moving targets from received echo signals that include both target returns and clutter returns, said receiver comprising:

means for detecting phase differences between each received signal and said transmitted signals and processing said phase difference signals through a Moving Target Indicator (MTI) canceler;

means for calculating the electronic signal amplitude which would be produced by said MTI canceler as a function of a predetermined radial target velocity and a predetermined phase difference signal input amplitude;

means for comparing said calculated electronic signal amplitude with the electronic signal amplitude produced by a received signal having the same phase difference signal amplitude which has been processed by said MTI canceler to determine if said electronic signal amplitude produced by a received radar signal is equal to, greater than or less than said calculated electronic signal amplitude;

means for rejecting MTI canceler output signals if the electronic signal amplitudes for said received signals are lower than the calculated electronic signal amplitudes for a predetermined radial target velocity having phase difference signal amplitudes that are equal to those of said received signals, the method of operating said receiver which comprises rejecting MTI canceler output signals if the electronic signal amplitudes for said received signals are equal to or less than the calculated electronic signal amplitudes for a predetermined radial target velocity having phase difference signal input amplitudes that are equal to those of said received signals.

3. The method of claim 2 further comprising recording said calculated electronic signal amplitudes in electronic storage means which correspond to both various radial target velocities and various phase difference signal input amplitudes.

4. The method of claim 3 further comprising accessing said electronic storage means to output for a predetermined radial target velocity and a phase difference signal input amplitude equal to that of a received signal the calculated electronic signal amplitude which would be produced by said MTI canceler.

5. The method of claim 4 further comprising comparing said calculated electronic signal amplitude with the electronic signal amplitude produced by a received signal having the same phase difference signal input amplitude which has been processed by said MTI canceler to determine if said electronic signal amplitude produced by a received signal is equal to, greater than or less than said calculated elecrtronic signal amplitude.

6. The method of claims 2 or 5 further comprising amplifying MTI canceler signals if the electronic signal amplitudes for said received signals are greater than the calculated electronic signal amplitudes for a predetermined radial target velocity having phase difference signal input amplitudes equal to those of said received signals.

* * * * *